US011358423B2

(12) United States Patent
Sotgiu et al.

(10) Patent No.: US 11,358,423 B2
(45) Date of Patent: *Jun. 14, 2022

(54) METHOD FOR MOUNTING A TYRE ON A RIM OR DEMOUNTING A TYRE FROM A RIM AND APPARATUS THEREFORE

(71) Applicant: Snap-on Equipment Srl a unico socio, Correggio (IT)

(72) Inventors: Paolo Sotgiu, Modena (IT); Francesco Braghiroli, Reggio Emilia (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 281 days.

This patent is subject to a terminal disclaimer.

(21) Appl. No.: 16/675,307

(22) Filed: Nov. 6, 2019

(65) Prior Publication Data

US 2020/0070599 A1 Mar. 5, 2020

Related U.S. Application Data

(60) Continuation of application No. 15/698,042, filed on Sep. 7, 2017, now Pat. No. 10,507,699, which is a
(Continued)

(30) Foreign Application Priority Data

Jan. 25, 2010 (EP) .................................... 10000720

(51) Int. Cl.
    *B60C 25/05*    (2006.01)
    *B60C 25/138*    (2006.01)

(52) U.S. Cl.
    CPC .......... *B60C 25/056* (2013.01); *B60C 25/138* (2013.01)

(58) Field of Classification Search
    CPC ........................... B60C 25/056; B60C 25/138
    See application file for complete search history.

(56) References Cited

U.S. PATENT DOCUMENTS

| 5,196,772 A | 3/1993 | Kupka et al. |
| 5,657,673 A | 8/1997 | Fukamachi et al. |

(Continued)

FOREIGN PATENT DOCUMENTS

| DE | 4028080 A1 | 3/1992 |
| DE | 4205045 C1 | 8/1993 |

(Continued)

OTHER PUBLICATIONS

Notice of Allowance dated Aug. 7, 2019 in U.S. Appl. No. 15/698,042.
(Continued)

*Primary Examiner* — Hadi Shakeri
(74) *Attorney, Agent, or Firm* — Studebaker & Brackett PC

(57) ABSTRACT

The present invention relates to a method and an apparatus for mounting a tyre on a rim or demounting a tyre from a rim. The method includes the steps of rotating the wheel (tyre/rim assembly) by an electric motor about an axis, checking the current consumption of the electric motor during the mounting and demounting operation, and continuously and automatically adjusting a specific combination of torque and speed of the electric motor during the mounting/demounting operation. The apparatus for mounting a tyre on a rim or demounting a tyre from a rim comprises an electric motor for rotating the wheel (rim/tyre assembly) about an axis, a sensing device for sensing the motor current and transmitting corresponding signals to a control device and an adjustment controller for continuously and automati-
(Continued)

cally adjusting a specific combination of torque and speed of the electric motor during the mounting/demounting operation.

20 Claims, 3 Drawing Sheets

Related U.S. Application Data division of application No. 14/517,413, filed on Oct. 17, 2014, now Pat. No. 10,513,158, which is a continuation-in-part of application No. 13/013,249, filed on Jan. 25, 2011, now Pat. No. 8,967,223.

(56) References Cited

U.S. PATENT DOCUMENTS

| | | | |
|---|---|---|---|
| 6,227,277 | B1 | 5/2001 | Corghi |
| 6,659,153 | B1 | 12/2003 | Kupka |
| 7,040,371 | B2 | 5/2006 | Mory et al. |
| 8,453,702 | B2 | 6/2013 | Corghi et al. |
| 8,613,303 | B1 | 12/2013 | Hanneken et al. |
| 8,662,134 | B2 * | 3/2014 | Lindsay .............. B24B 49/04 157/13 |
| 8,967,223 | B2 | 3/2015 | Braghiroli et al. |
| 9,662,945 | B2 | 5/2017 | Molbach et al. |
| 2004/0200579 | A1 | 10/2004 | Mory et al. |
| 2012/0199293 | A1 * | 8/2012 | Corghi .............. B60C 25/138 157/1.24 |
| 2012/0267054 | A1 | 10/2012 | Kirstatter |
| 2014/0083625 | A1 | 3/2014 | Sotgiu |

FOREIGN PATENT DOCUMENTS

| | | |
|---|---|---|
| EP | 0911190 A1 | 4/1999 |
| EP | 1247661 A2 | 10/2002 |
| GB | 2466879 A | 7/2010 |

OTHER PUBLICATIONS

Non Final Office Action dated Jan. 28, 2019 in U.S. Appl. No. 15/698,042.
Final Office Action dated Jul. 8, 2019 in U.S. Appl. No. 15/698,042.
Notice of Allowance dated Aug. 15, 2019 in U.S. Appl. No. 14/517,413.
Non Final Office Action dated Aug. 29, 2019 in U.S. Appl. No. 14/517,413.
Non Final Office Action dated Nov. 22, 2016 in U.S. Appl. No. 14/517,413.
Non Final Office Action dated Aug. 31, 2017 in U.S. Appl. No. 14/517,413.
Final Office Action dated Feb. 11, 2019 in U.S. Appl. No. 14/517,413.
Final Office Action dated Jan. 29, 2018 in U.S. Appl. No. 14/517,413.
Final Office Action dated Apr. 12, 2017 in U.S. Appl. No. 14/517,413.
Search Report and Written Opinion dated Jul. 6, 2010 in counterpart European Patent Application No. 10000720.2.
Office Action dated Feb. 8, 2014 in counterpart Chinese Application No. 201010552161.3.
Notice of Allowance dated Oct. 27, 2014 in U.S. Appl. No. 13/013,249.
Non Final Office Action dated Mar. 20, 2014 in U.S. Appl. No. 13/013,249.
Final Office Action dated Nov. 5, 2013 in U.S. Appl. No. 13/013,249.
Non Final Office Action dated May 24, 2013 in U.S. Appl. No. 13/013,249.

* cited by examiner

METHOD FOR MOUNTING A TYRE ON A RIM OR DEMOUNTING A TYRE FROM A RIM AND APPARATUS THEREFORE

CROSS-REFERENCE TO RELATED APPLICATIONS

This application is a continuation of U.S. patent application Ser. No. 15/698,042, filed Sep. 7, 2017, which is divisional of U.S. patent application Ser. No. 14/517,413, filed on Oct. 17, 2014, which is a continuation-in-part of U.S. patent application Ser. No. 13/013,249, filed on Jan. 25, 2011, no U.S. Pat. No. 8,967,223, issued on Mar. 3, 2015, which claims the benefit of European Patent Application No. 10 000 720.2, filed on Jan. 25, 2010, the disclosures of which are hereby incorporated by reference herein in their entireties.

TECHNICAL FIELD

The invention concerns a method for mounting a tyre on a rim or demounting a tyre from a rim. Furthermore, the invention concerns an apparatus for mounting a tyre on a rim or demounting a tyre from a rim.

BACKGROUND

An apparatus for mounting a tyre on a rim or demounting a tyre from a rim with an electric motor which drives a shaft of a rotary disc is already known from the prior art. For example, EP 0 911 190 discloses such an apparatus. Thereby, an electric motor is used which can be powered with different supply voltages as the supply voltage differs for different countries. An apparatus for mounting a tyre on a rim or demounting a tyre from a rim is shown in DE 42 05 045; especially DE 42 05 045 shows a rim or a tyre being positioned on the rotary disc. By means of a tyre fitting or removal tool the tyre is mounted on the rim or demounted from the rim. The electric motor is activatable by a foot pedal. By a corresponding more or less activation of the foot pedal an operator is able to change the motor torque and thus the movement of the rotary disc.

Such a known apparatus allows a mounting and demounting of tyres which prevents the tyres from damage as the operator is able to change the motor torque and adapt it to different requirements, e.g. a high motor torque for tyres comprising a high stiffness.

It is an object of the present invention to provide a method and an apparatus for mounting or demounting a tyre with which a further improvement of the mounting and demounting process is achieved preventing the tyres from damage.

SUMMARY

According to the present invention, there is provided a method for mounting a tyre on a rim or demounting a tyre from a rim, the method comprises the steps of rotating the wheel (tyre/rim assembly) by an electric motor about an axis, checking the current consumption of the electric motor during the mounting and demounting operation and continuously and automatically adjusting a specific combination of torque and speed of the electric motor during the mounting/demounting operation.

For adapting the mounting/demounting conditions to the kind of tyre and/or rim to be treated, according to an advantageous embodiment of the inventive method, different specific combinations of torque and speed of the electric motor are provided, which may be selected for controlling the mounting/demounting operation In a further advantageous step of the inventive method, the specific combinations of torque and speed of the electric motor are selected by adjusting the frequency and/or the amplitude of the motor current and/or the voltage.

In order to facilitate the adjustment of the method to the kind of tyre and/or rim, or in order to select a specifically optimized operation mode, predetermined values of the frequency and/or the amplitude of the motor current and/or the voltage are provided, which correspond to specific combinations of torque and speed of the electric motor.

When selecting specific operation modes by adjusting specific combinations of torque and speed of the electric motor, different targets may be achieved. One specific combination of torque and speed of the electric motor may be selected such that the electric motor runs on a maximum speed level. Another specific combination of torque and speed of the electric motor may be selected such that the electric motor runs on a minimum speed level. Moreover, a specific combination of torque and speed of the electric motor may be selected such that the electric energy consumption of the electric motor is minimized. Furthermore, a specific combination of torque and speed of the electric motor may be selected such that the noise emission of the electric motor is minimized.

It has to be understood that other targets as those mentioned above, may be achieved by selecting other specific combinations of torque and speed of the electric motor.

According to the present invention, there is provided an apparatus for mounting a tyre on a rim or demounting a tyre from a rim, the apparatus comprises an electric motor for rotating the wheel (rim/tyre assembly) about an axis, a sensing device for sensing the motor current and transmitting corresponding signals to a control device, and adjustment controller for continuously and automatically adjusting a specific combination of torque and speed of the electric motor during the mounting/demounting operation.

Advantageously, in order to enable the selection of specific combinations of torque and speed of the electric motor, the adjustment controller is adapted to adjusting the frequency and/or the amplitude of the motor current and/or the voltage.

Further advantageously, the adjustment controller provides predetermined values of the frequency and/or the amplitude of the motor current and/or the voltage.

Moreover, in the inventive apparatus, dependent on the specific combination of torque and speed of the electric motor to be selected, one of the predetermined values of the frequency and/or the amplitude of the motor current and/or the voltage may be set.

In one embodiment, the adjustment controller includes a pedal of the tyre mounting/demounting apparatus, whereby an operator may easily select a desired combination of torque and speed of the electric motor Alternatively or additionally to the selection by a pedal, the adjustment controller is provided in the control unit of the tyre mounting/demounting apparatus. The desired combination of torque and speed of the electric motor may than be selected directly at the control unit.

Further according to the present invention, in order to improve precision of measurement and thus, to improve the inventive method, indirect measurement of the resistance torque through gauging the current absorbed by the electric motor may be integrated, or a direct measurement may be executed by providing the tyre mounting/demounting apparatus with a torque sensor of any known type. Alternatively or additionally, torque may be calculated starting from a speed measurement, e.g. by a rotary encoder. Further alternatively, a strain gauge is provided, which may be mounted on the tool support arm or in any other suitable position within the tyre mounting/demounting apparatus.

It has to be understood that all these different methods to assess the actual mounting/demounting conditions could be used as alternatives or in combination.

Moreover, there is disclosed a method for mounting a tyre on a rim or demounting a tyre from a rim, wherein the wheel (tyre/rim assembly) is rotated by an electric motor about an axis, wherein the motor current fed to the electric motor is controlled dependent on the rotational speed and torque required for the mounting and/or demounting operation, and wherein the motor current is automatically changed to apply a high torque peak, when the measured motor current is greater than a preset limit at a low rotational speed during a preset time. It is autonomously detected when a high torque peak is required and such a high torque peak is automatically applied. The high torque peak is achieved in changing the motor current, in particular in changing the frequency and/or the amplitude of the motor current. The applied high torque peak is also called "boost" function in the following. The "boost" function is synonymous with an activation of a pedal with which the electric motor is started. That means the "boost" function simulates a pedal retry of an operator in increasing the motor current fed to the electric motor. Such a motor current changing is useful as speed and torque requirements during mounting and/or demounting operations are different depending on the kind of the mounted and/or demounted tyre. In particular, the side walls of the tyres have different stiffness. For tyres with a high stiffness, e.g. run flat tyres, low speed and high torque are required, however for basic operations high speed and low torque are required. Advantageously, the method according to the invention prevents the tyres from damage during mounting and/or demounting process. The high torque peak is applied to the electric motor when the present current is greater than a preset limit at a low rotational speed during a preset time. The actual low speed corresponds e.g. to the nominal speed of the motor at 50 Hz (which approximately corresponds to 1500 rpm for a standard four-pole motor). The speed of the motor is reduced by means of a gearbox to about 7 rpm at the main shaft. That means when the shaft rotated by the electric motor is slowed down due to a high request of torque at a low rotational speed and this high request of torque exists during a preset time, the motor current is changed.

Preferably, the preset time is longer than the period during which the high torque peak is applied.

In particular, the preset time is three to ten times longer than the period of applying the torque peak.

The motor current is preferably set back to normal condition after applying the torque peak. After applying the torque peak, the method for mounting or demounting a tyre is continued with the motor current for normal conditions until a further high request of torque is detected by the converter. For example, the actual low speed corresponds to the nominal speed of the motor at 50 Hz—which approximately corresponds to 1500 rpm for a standard four-pole motor—and the actual high speed corresponds to the nominal speed of the motor at 100 Hz—which approximately corresponds to 3000 rpm for a standard four-pole motor. The actual low speed of the motor is reduced by means of a gearbox to about 7 rpm at the main shaft, and the actual high speed of the motor is reduced by means of a gearbox to about 14 rpm at the main shaft.

Preferably, the frequency and/or the amplitude of the motor current is increased within a preset maximum limit to apply a torque peak. Such a preset limit is given, e.g. stored, and prevents that the electric motor is driven with an excessive current frequency which leads to a damage of the electric motor.

The cycle of applying the torque peak and setting back to normal condition can be repeated.

Furthermore, there is disclosed an apparatus for mounting a tyre on a rim or demounting a tyre from a rim comprising an electric motor for rotating the wheel (rim/tyre assembly) about an axis, a controlled device for delivering the motor current to the electric motor and a sensing device for sensing the motor current and transmitting corresponding signals to a control device controlling the motor current dependent on the rotational speed and torque requirement for the mounting and/or demounting operation, wherein the control device is able to change the motor current to apply a high torque peak, when the measured motor current is greater than a preset limit at a low rotational speed during a preset time. With respect to the advantages it is referred to the above mentioned explanations.

Preferably, a time counter is connected to the control device to predetermine a time limit interval during which a motor current greater than a preset limit is measured. Thereby, the time counter can be a separate part or the time counter can be integrated into the control device.

The control device can comprise a microprocessor which adjusts a power driving circuit with power switches to control the motor current.

The electro motor is a two-phase or a three-phase electric motor, i.e. the electric motor is driven with two-phase current or three-phase current.

Preferably, the apparatus comprises a low voltage circuit providing the control device with low voltage.

BRIEF DESCRIPTION OF THE DRAWINGS

The invention will be described in greater detail herein after by means of embodiments by way of example with reference to the Figures in which.

DETAILED DESCRIPTION

Figure 1:
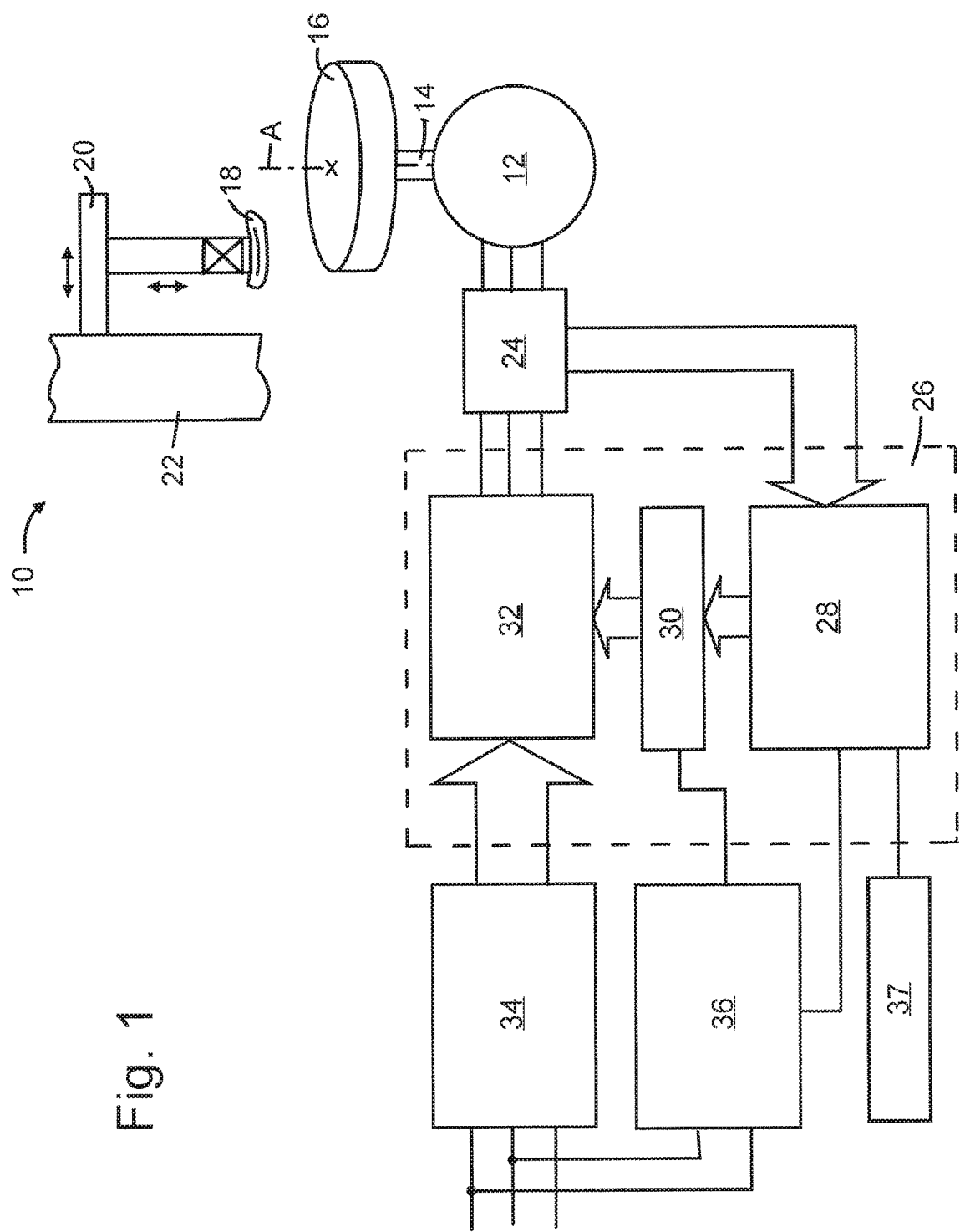
FIG. 1 schematically shows an apparatus in which a method according to the invention can be conducted.

In FIG. 1 a tyre changer is diagrammatically shown, the tyre changer 10 comprising an electric motor 12, in particular three-phase motor, for driving a drive shaft 14 of a rotary disc 16. Alternatively, a one-phase motor or a two-phase motor, especially induction motor, can be used. In particular a four-pole motor is used. On the rotary disc 16 tyres being centered to the rotary axis A of the rotary disc 16 can be positioned. A tyre fitting or removal head 18 is fixed on a pivotable arm 20, the arm 20 being attached to a housing 22.

The motor current, especially the frequency and/or the amplitude of the motor current fed to the electric motor 12 is changeable which results in a different speed of the driven shaft 14. Additionally, also the voltage at electric motor 12 is changeable which also results in a different speed of the driven shaft 14. In order to detect the motor current fed to the electric motor 12, a sensing device 24 is connected with the electric motor 12. Furthermore, the sensing device 24 is connected with a control device 26. Signals from the sensing device 24 are transmitted to the control device 26, for checking the current consumption of electric motor 12. Depending on the signals detected from the sensing device 24, the control device 26 is able to control the motor current dependent on the rotational speed and torque requirement for the mounting and/or demounting operation. In particular, the control device 26 is able to change the frequency and/or the amplitude of the motor current and/or the voltage fed to the electric motor 12. Such a changing in the motor current is useful as speed and torque requirements during mounting and/or demounting operations are different depending on the kind of the mounted and/or demounted tyre. In particular, the side walls of the tyres have different stiffness. For tyres with a high stiffness, e.g. run flat tyres, low speed and high torque are required, however for basic operations high speed and low torque are required.

The control device 26 is able to autonomously detect, when the rotation of the shaft 14 is slowed down due to high request of torque, and is able to automatically start a so-called "boost" function. This "boost" function is synonymous with an activation of a pedal with which the electric motor 12 is started. That means the "boost" function simulates a pedal retry of an operator. This provides a torque peak of the electric motor 12. Thereby the current fed to the electric motor 12 is changed in increasing the motor current fed to the electric motor 12 within given limit values. The control device 26 autonomously detects a requirement of changing the motor current fed to the electric motor 12 to apply a high torque peak. After detecting the requirement, the motor current is automatically changed. An action of an operator is thereby not necessary. The control device 26 comprises a microprocessor 28, an interface circuit 30 and a controlled device 32. The sensing device 24 is connected with the microprocessor 28, signals from the sensing device 24 indicating the motor current fed to the electric motor 12 being transmitted from the sensing device 24 to the microprocessor 28. Depending on these signals, the microprocessor 28 being able to adjust the controlled device 32 comprising power switches to control the motor current. The interface circuit 30 positioned between the microprocessor 28 and the controlled device 32 serves for converting and forwarding the commands of the microprocessor 28 to the controlled device 32. The interface circuit 30 provides voltage interface conversions, supplies dead time protection and shut down function protection. The controlled device 32 comprising power switches which are used to drive the electric motor 12 are positioned between the motor current sensing device 24 and a high voltage circuit 34, the high voltage circuit 34 powers the electric motor 12.

Furthermore, a low voltage circuit 36 is provided comprising a transformer to reduce the voltage, a bridge rectifier, filter and a regulator to provide low voltage levels being provided to the interface circuit 30 and to the circuit of the microprocessor 28.

Furthermore, a time counter 37 is provided, the time counter 37 being connected to the control device 26, especially the microprocessor 28, to predetermine a time limit interval during which a motor current which is greater than a preset limit is measured. When the measured motor current is greater than a preset limit during the preset time, a high torque peak is applied. Alternatively, the time counter 37 can be integrated into the control device (not shown).

Alternatively to the "boost" function, specific combinations of torque and speed of the electric motor during the mounting/demounting operation may continuously and automatically be adjusted by control device 26.

Figure 3:
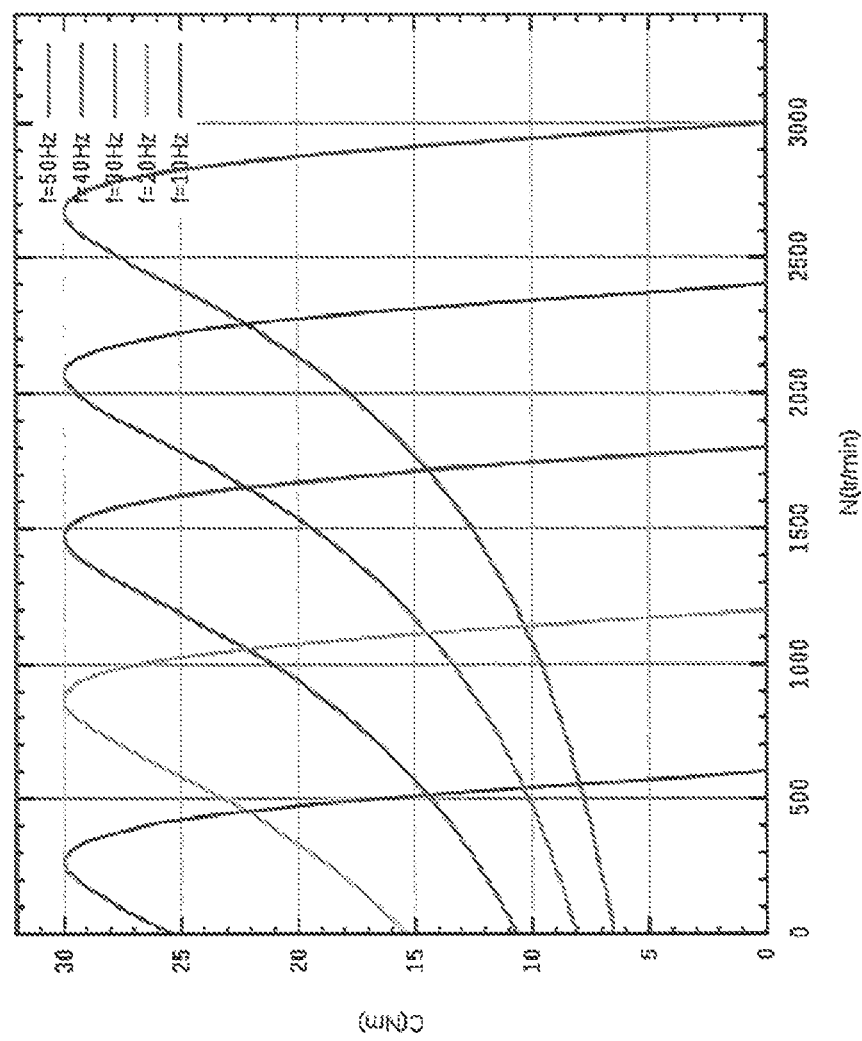
FIG. 3 is a chart of characteristic curves of a specific electric motor.

The specific characteristic curves of an electric motor are known. FIG. 3 shows such characteristic curves. As it can be seen from FIG. 3, dependent on the frequency of the current fed to the electric motor, and the rotational speed of the motor, torque increases with the increase of the rotational speed up to a maximum torque, and by further increasing the rotational speed, torque decreases.

Furthermore, by changing the amplitude of the current fed to the electric motor, or by changing the voltage, the rotational speed of an electric motor may be changed, which results in a torque value according to the specific characteristic curve of the electric motor.

By selecting the frequency and/or the amplitude of the motor current and/or the voltage fed to the electric motor 12, a desired combination of torque and speed of the electric motor may be adjusted. Furthermore, by continuously monitoring the selected frequency and/or the amplitude of the motor current and/or the voltage fed to electric motor 12, the desired combination of torque and speed of the electric motor may be maintained constant during the mounting/demounting operation.

Alternatively, the desired combination of torque and speed of the electric motor may be selected such that said combination varies during the mounting/demounting operation, e.g. for starting the mounting operation at a low speed level, increasing the speed during the mounting operation, and, lowering the speed for finishing the mounting operation. The respective selected speed of electric motor 12 results in a corresponding torque value according to the characteristic curve of electric motor 12.

For varying the speed of electric motor 12 during the mounting/demounting operation, the selected frequency and/or the amplitude of the motor current and/or the voltage fed to the electric motor 12 are not only continuously monitored, but also continuously and automatically adjusted, e.g. according to the selected speed profile.

The frequency and/or the amplitude of the motor current and/or the voltage fed to the electric motor 12 may also be selected for adjusting a desired torque value, e.g. depending on the kind of tyre to be mounted or demounted, or the specific mounting or demounting step. Exemplarily, when starting a demounting operation, the tyre bead has to be removed from the rim, by being pulled over the rim edge. Thereby, an increased torque value may be required, whereas torque may be lowered after a first portion of the tyre bead has been lifted over the rim edge. Further exemplarily, different kinds of tyres may have side walls or tyre beads of different stiffness requiring different torque values during identical mounting/demounting operation periods.

Thus, by selecting the frequency and/or the amplitude of the motor current and/or the voltage fed to electric motor 12, torque and speed may be constantly fine-tuned and adjusted depending on the actual operating mounting/demounting conditions.

For executing the inventive method, control device 26 may be provided with preselected values of frequencies and/or amplitudes of the motor current and/or the voltages to be fed to electric motor 12, which lead to specific combination of torque and speed of electric motor 12, and which may be selected by the operator dependent on the kind of tyre to be treated.

When selecting specific operation modes by adjusting specific combinations of torque and speed of the electric motor, different targets may be achieved. One specific combination of torque and speed of the electric motor may be selected such that the electric motor runs on a maximum speed level. Another specific combination of torque and speed of the electric motor may be selected such that the electric motor runs on a minimum speed level. Moreover, a specific combination of torque and speed of the electric motor may be selected such that the electric energy consumption of the electric motor is minimized. Furthermore, a specific combination of torque and speed of the electric motor may be selected such that the noise emission of the electric motor is minimized.

For selecting a specific operation mode, dependent on the target to be achieved and/or the kind of tyre to be treated, the operator may use control device 26, in which a variety of combinations of torque and speed of electric motor 12 are stored. Alternatively or additionally thereto, the pedal by which electric motor 12 may be started, can include the additional functionality of selecting said specific operation modes. The pedal may be coupled to control device 26, and, by activating the pedal in a required manner, a respective operation mode is selected. The pedal may have different positions corresponding to the different operation modes selectable by the pedal, or the pedal may be designed such that different operation modes may be selected by pushing the pedal one time for generally starting the mounting/demounting apparatus, and several times thereafter, for selecting a desired operation mode. Naturally, other activation procedures are possible for selecting a desired operation mode.

In order to improve precision of measurement of the torque applied by electric motor 12, indirect measurement of the resistance torque through gauging the current absorbed by electric motor 12 may be integrated, or a direct measurement may be executed by providing the tyre mounting/demounting apparatus with a torque sensor of any known type. Alternatively or additionally, torque may be calculated starting from a speed measurement, e.g. by a rotary encoder. Further alternatively, a strain gauge is provided, which may be mounted on the tool support arm or in any other suitable position within the tyre mounting/demounting apparatus.

Figure 2:
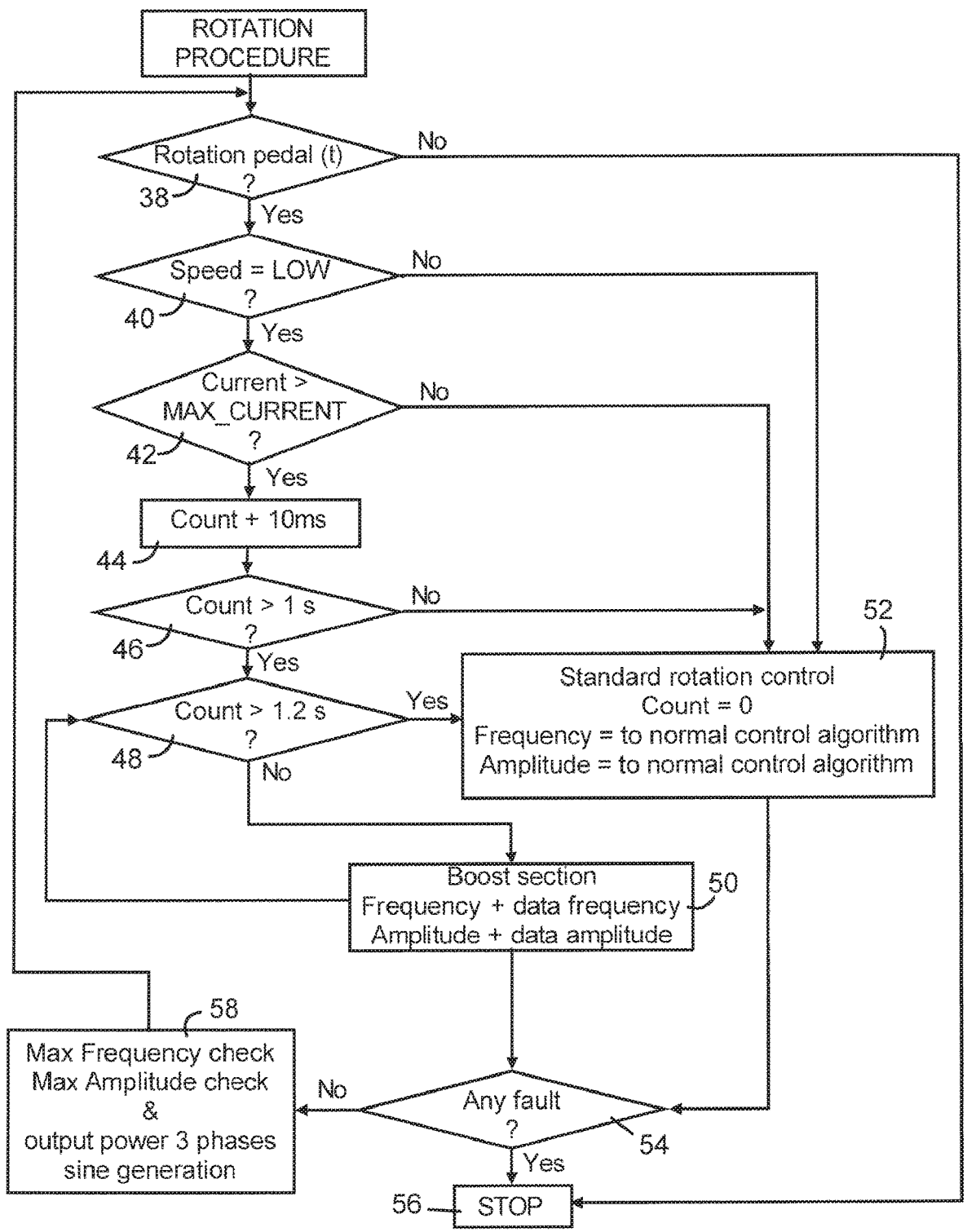
FIG. 2 shows a flow chart of the method according to the invention.

A flow chart of the method according to the method including the "boost" function which is conducted with the apparatus as explained above is shown in FIG. 2.

In a first step, which is indicated with reference numeral 38, it is inspected if the foot pedal (not shown) is activated.

Only if the pedal is activated, that means if the first interrogation 38 can be answered with "yes", it is checked, in a second step 40, if the present speed of the electric motor 12 and thus of the drive shaft 14 is low. Thereby, a "low" speed means that the present speed is lower than a speed which is present with "normal" conditions. Values which represent the speed of several kinds of tyres with "normal" conditions can be entered and recalled. A "low" speed indicates a torque which exceeds the corresponding limit value. A "low" speed can be detected by the motor current sensing device 24 in an increase of the current of the electric motor 12. Alternatively, a "low" speed can be detected by a speed sensor (not shown) observing the speed of the drive shaft 14 or of the electric motor 12. Corresponding signals are sent by the motor current sensing device 24 or the speed sensor to the converter 26, in particular to the microprocessor 28 being part of the converter 26. For example, the actual low speed corresponds to the nominal speed of the motor at 50 Hz—which approximately corresponds to 1500 rpm for a standard four-pole motor—and the actual high speed corresponds to the nominal speed of the motor at 100 Hz—which approximately corresponds to 3000 rpm for a standard four-pole motor. The actual low speed of the motor is reduced by means of a gearbox to about 7 rpm at the main shaft, and the actual high speed of the motor is reduced by means of a gearbox to about 14 rpm at the main shaft.

If the present speed of the electric motor 12 and thus of the drive shaft 14 is low, e.g. the second interrogation 40 is answered with "yes", the present current of the electric motor 12 is compared with a maximum current in a third step 42. Thereby, it is checked, if the present current is greater than a maximum current. The present current of the electric motor 12 is measured by the motor current sensing device 24 and a corresponding signal is transmitted to the microprocessor 28. The microprocessor 28 compares the signal of the motor current sensing device 24, which corresponds to the measured current, with a stored limit value for the present kind of tyre and detects if the present current of the electric motor 12 is greater than the maximum current. Limit values for several kinds of tyres are stored in the microprocessor 28.

If the measured current of the electric motor 12 is greater than a preset limit, a time counter 37 starts (see step 44). If the measured current of the electric motor 12 persists for a preset time, e.g. for one second (see step 46), the "boost" function is started for about 0.2 seconds. In other words, the "boost" function is conducted as long as the interrogation "Count>1.2 s" can be answered with "no", i.e. as long as the elapsed time is smaller than 1.2 seconds the "boost" function is conducted (see steps 48, 50). Is the elapsed time greater than 1.2 seconds, the motor current is set back to normal condition (see step 52). As already explained above, the "boost" function is synonymous with an activation of the pedal with which the electric motor 12 is started. That means the "boost" function simulates a pedal retry of an operator which provides a torque peak of the electric motor 12. The frequency and/or the amplitude of the motor current fed to the electric motor 12 is changed, especially increased, within given limit values.

If there are detected any faults, the method is stopped (see steps 54, 56). Otherwise, the method starts again (see steps 54, 58).

Furthermore, the motor is driven with normal condition (see step 52), if the present speed of the electric motor 12 and thus of the drive shaft 14 is not low (i.d. interrogation 40 is answered with "no"), if the present current is lower than a maximum current (i.d. interrogation 42 is answered with "no") and if the measured current is for less than is greater than the maximum current (i.d. interrogation 46 is answered with "no").

Furthermore, if the pedal is not activated (see step 38), the method is stopped (see step 56).

Accordingly, it is autonomously detected, when the speed of the electric motor 12 and thus of the drive shaft is slowed down due to high request of torque, and the "boost" function is automatically started. Thereby, the frequency and/or the amplitude of the current fed to the electric motor 12 is increased within maximum limits. This "boost" function simulates a pedal retry of an operator and provides a torque peak of the electric motor 12.

For executing the inventive method for mounting/demounting a tyre to or from a rim, exemplarily for demounting a tyre from a rim, the operator mounts a vehicle wheel, which is a tyre/rim combination, to the mounting/demounting apparatus.

Dependent on the kind of the tyre, the rim or the target to be achieved, like a high speed of the demounting process, or low noise emission during the process, the operator selects an operation mode by calling a respective program in control device 26 before starting the mounting/demounting apparatus. Alternatively, a "standard" program may be used to start the mounting/demounting apparatus, and after the mounting/demounting apparatus has been started, the desired operation mode may be selected.

Naturally, in the case that the pedal is designed to start the mounting/demounting apparatus, the operator may start the demounting process by pushing the pedal for starting and selecting a desired operation mode.

During the demounting process, sensing device 24 which is connected with control device 26, transmits signals to the control device 26, for checking the current consumption of electric motor 12. Then, as the degree of electric current consumption can be related to the motor resistance torque, the frequency and/or the amplitude and/or the voltage can constantly and automatically be adjusted to impart to the motor an optimal torque/speed combination in view of the mounting/demounting conditions.

The mounting/demounting conditions are affected by the tire rigidity, especially by the rigidity of the tire beads, and by the kind of tire servicing operation that is being carried out.

In an exemplary case, the mounting/demounting apparatus can be started with the motor running at a "standard" speed. Then, by pressing e.g. a pedal, the motor could be set to "automatic mode", when the combination speed/torque is continuously automatically adjusted depending on actual conditions, as explained above. The motor speed could range from ca. 900 rpm (corresponding to 20 Hz frequency, in the case of a four-pole standard induction motor), to ca. 4500 rpm (corresponding to 150 Hz); these speeds are then further reduced by means of a gearbox to a range of approx. 2.8 rpm to approx. 21 rpm. The initial "standard" speed could be set anywhere within that range. Thereby, speed ranges are broader than those of known mounting/demounting apparatuses.

It has to be noted that the mounting/demounting operation may be started at a "standard" speed or according to a "standard" method, and that after being started, an alternative operation mode may be selected. Alternatively or additionally, according to the method of the present invention, the mounting/demounting operation may also be started with a selected specific operation mode as disclosed above.

It has further to be noted that an operation mode not necessarily needs to be executed at a single or constant torque/speed combination. Depending on the kind of the tyre to be treated and/or the target to be achieved, the torque/speed combination may be varied during the mounting/demounting operation.

It has also to be understood that the operation mode may be changed during the mounting/demounting operation, e.g. in the case that the mounting/demounting conditions or in the case that the target to be achieved have been changed.

The invention claimed is:

1. A method for mounting a tyre on a rim or demounting the tyre from the rim, comprising:
    rotating a wheel, including an assembly of the tyre and the rim, by an electric motor about an axis,
    selecting, depending on a target to be achieved during a mounting or demounting operation, a set of plural operation modes of the electric motor from a plurality of sets of plural operation modes of the electric motor for the target to be achieved, each operation mode corresponding to a specific combination of torque and speed of the electric motor,
    wherein when operating according to the selected set of operation modes, a first combination of torque and speed of the electric motor is used during a first time period of the mounting or demounting operation, and a second combination of torque and speed of the electric motor is used during a second time period of the mounting or demounting operation,
    the method further comprising:
    determining a current consumption of the electric motor during the mounting or demounting operation, and
    continuously and automatically adjusting the first and second combinations of torque and speed of the electric motor during the mounting or demounting operation based at least in part on the determined current consumption.

2. The method according to claim 1, wherein the target is selected from the group consisting of maximizing a speed level of the electric motor, minimizing an electric energy consumption of the electric motor, minimizing noise emission of the electric motor, and minimizing the speed level of the electric motor.

3. The method according to claim 1, further comprising:
    selecting the first and second combinations of torque and speed of the electric motor by adjusting a frequency and/or an amplitude of a motor current and/or a voltage.

4. The method according to claim 3, further comprising:
    providing predetermined values of the frequency and/or the amplitude of the motor current and/or the motor voltage, which correspond to the first and second combinations of torque and speed of the electric motor.

5. The method according to claim 4, wherein the target of the selected set of operation modes is that the electric motor runs on a maximum speed level.

6. The method according to claim 4, wherein the target of the selected set of operation modes is that the electric motor runs on a minimum speed level.

7. The method according to claim 4, wherein the target of the selected set of operation modes is that an electric energy consumption of the electric motor is minimized.

8. The method according to claim 4, wherein the target of the selected set of operation modes is that a noise emission of the electric motor is minimized.

9. The method according to claim 1, wherein the target of the selected set of operation modes is that the electric motor runs on a maximum speed level.

10. The method according to claim 1, wherein the target of the selected set of operation modes is that the electric motor runs on a minimum speed level.

11. The method according to claim 1, wherein the target of the selected set of operation modes is that the electric energy consumption of the electric motor is minimized.

12. The method according to claim 1, wherein the target of the selected set of operation modes is that a noise emission of the electric motor is minimized.

13. The method according to claim 1, wherein the electric motor runs at different selectable speed levels for different kinds of tyres or different mounting or demounting steps, and
    the continuously and automatically adjusting the first and second combinations of torque and speed of the electric motor is performed based at least in part on selections of kinds of tyres or mounting or demounting steps.

14. An apparatus for mounting a tyre on a rim or demounting a tyre from the rim, comprising:
    an electric motor for rotating a wheel, including an assembly of the rim and the tyre, about an axis in accordance with a set of plural operation modes of the electric motor selected from a plurality of sets of plural operation modes of the electric motor depending on a target to be achieved during a mounting or demounting operation, each operation mode corresponding to a specific combination of torque and speed of the electric motor, a sensing device for sensing a motor current of the electric motor during the mounting or demounting operation and transmitting corresponding signals to a control device, and a time counter connected to the control device, wherein when operating according to the selected set of operation modes, a first combination of torque and speed of the electric motor is used during a first time period of the mounting or demounting operation, and a second combination of torque and speed of the electric motor is used during a second time period of the mounting or demounting operation, the control device comprising an adjustment controller adapted to continuously and automatically adjust the first and second combinations of torque and speed of the electric motor during the mounting or demounting operation based at least in part on the sensed motor current.

15. The apparatus according to claim 14, wherein the adjustment controller is adapted to adjust a frequency and/or an amplitude of a motor current and/or a voltage of the electric motor.

16. The apparatus according to claim 15, wherein the adjustment controller provides predetermined values of the frequency and/or the amplitude of the motor current and/or the voltage.

17. The apparatus according to claim 16, wherein, dependent on the first and second combinations of torque and speed of the electric motor to be selected, one of the predetermined values of the frequency and/or the amplitude of the motor current and/or the voltage may be set.

18. The apparatus according to claim 14, further comprising a pedal for selecting the first and second combinations of torque and speed from a plurality of the combinations torque and speed.

19. The apparatus according to claim 14, wherein the electric motor runs at different selectable speed levels for different kinds of tyres or different mounting or demounting modes, and the apparatus further comprises a storage for storing the specific combinations of torque and speed and an input for receiving selections of kinds of tyres or mounting or demounting modes.

20. A method for mounting a tyre on a rim or demounting the tyre from the rim using an electric motor, comprising:

selecting, depending on a target to be achieved during a mounting or demounting operation, a set of plural operation modes of the electric motor from a plurality of sets of plural operation modes of the electric motor for the target to be achieved, each operation mode corresponding to a specific combination of torque and speed of the electric motor, wherein when operating according to the selected set of operation modes, a first combination of torque and speed of the electric motor is used during a first time period of the mounting or demounting operation, and a second combination of torque and speed of the electric motor is used during a second time period of the mounting or demounting operation, the method further comprising:

rotating a wheel, including an assembly of the tyre and the rim, by the electric motor about an axis in accordance with the selected set of operation modes, determining a speed of the electric motor during the mounting or demounting operation, and continuously and automatically adjusting the first and second combinations of torque and speed of the electric motor during the mounting or demounting operation, based at least in part on the determined speed.

* * * * *